F. P. WHITEHEAD.
PHOTOGRAPHIC SHUTTER.
APPLICATION FILED JULY 19, 1909.

976,712.

Patented Nov. 22, 1910.

3 SHEETS—SHEET 1.

WITNESSES.

INVENTOR.
F. P. Whitehead
By Chas. E. Brock
atty.

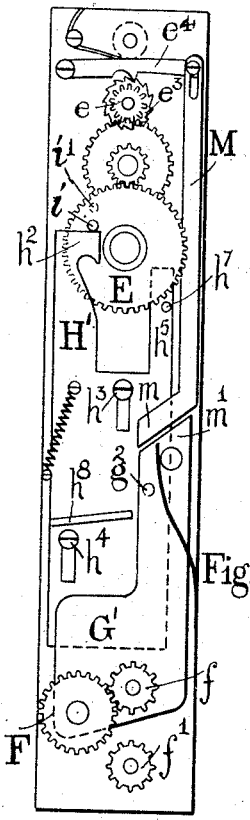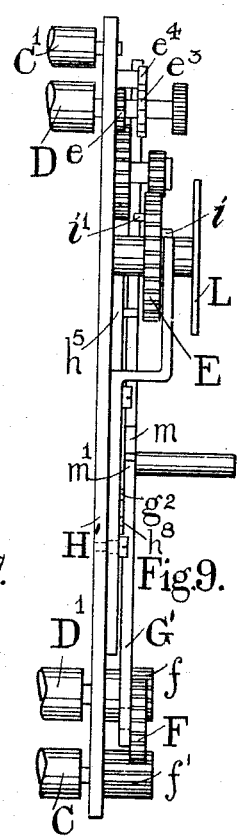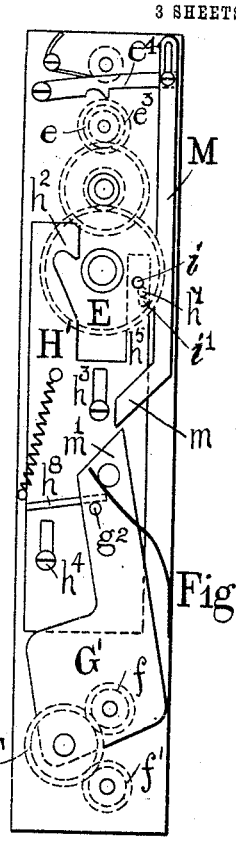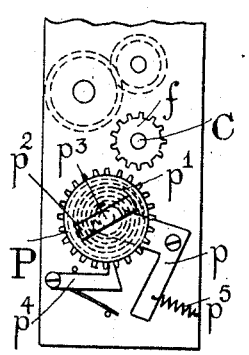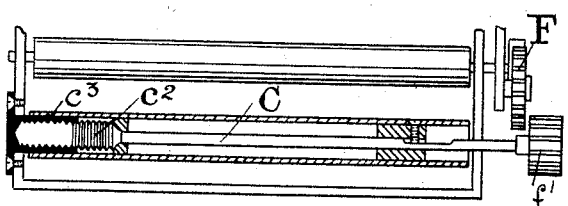

F. P. WHITEHEAD.
PHOTOGRAPHIC SHUTTER.
APPLICATION FILED JULY 19, 1909.

976,712.

Patented Nov. 22, 1910.
3 SHEETS—SHEET 3.

WITNESSES.
INVENTOR
F. P. Whitehead
By Chas. E. Brock
atty.

UNITED STATES PATENT OFFICE.

FRANK PHILIP WHITEHEAD, OF BALHAM, LONDON, ENGLAND, ASSIGNOR TO THE THORNTON-PICKARD MANUFACTURING COMPANY LIMITED, OF ALTRINCHAM, ENGLAND, A CORPORATION OF GREAT BRITAIN.

PHOTOGRAPHIC SHUTTER.

976,712.     Specification of Letters Patent.     Patented Nov. 22, 1910.

Application filed July 19, 1909. Serial No. 508,498.

*To all whom it may concern:*

Be it known that I, FRANK PHILIP WHITEHEAD, a British subject, residing at Balham, London, England, have invented certain new and useful Improvements in Photographic Shutters, of which the following is a specification.

This invention relates to certain improvements in photographic shutters of the class known as "self-capping shutters" in which two blinds of opaque material are employed mounted on rollers at opposite sides of the shutter the two blinds moving together with an aperture between their edges to effect an exposure and the capping blind returning across the lens before any movement of the other blind to reset the shutter for another exposure.

The invention is designed to provide suitable means or mechanism to automatically return the capping blind to its position covering the lens immediately after an exposure has taken place and comprises a construction and arrangement of the mechanism for operating the blinds simultaneously in one direction and separately or independently in the reverse direction and for adjusting one blind to the other to regulate the width of the exposure aperture.

The invention will be described with reference to the accompanying drawings.

Figure 1:
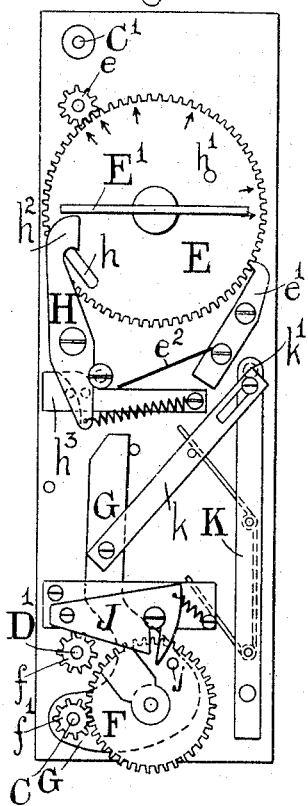
Figure 5:
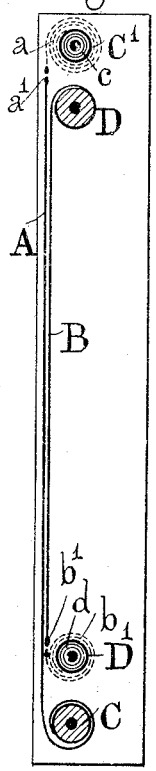
Figure 3:
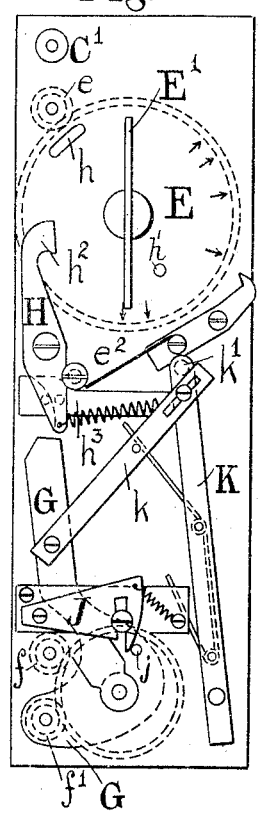
Figure 6:
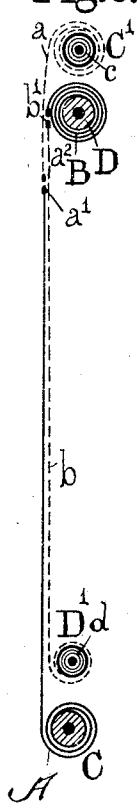
Figure 2:
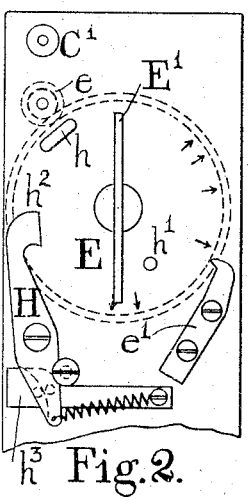
Figure 4:
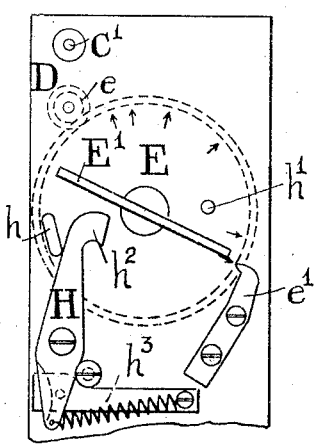
Figure 10:
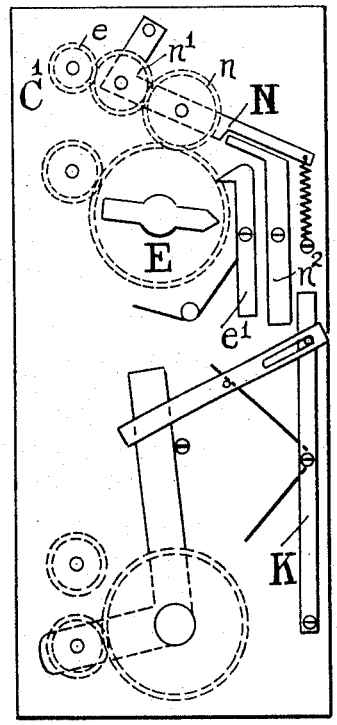
Figure 11:
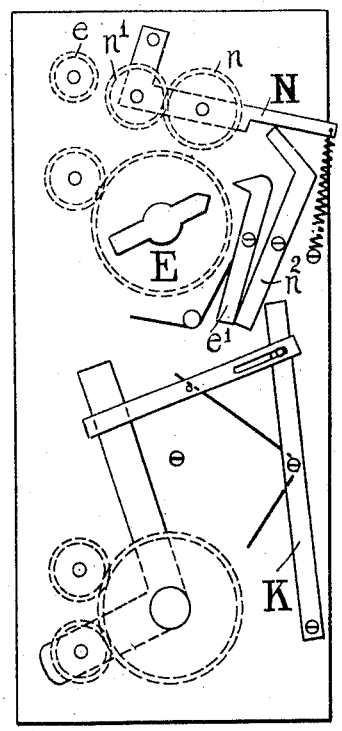
Figure 14:
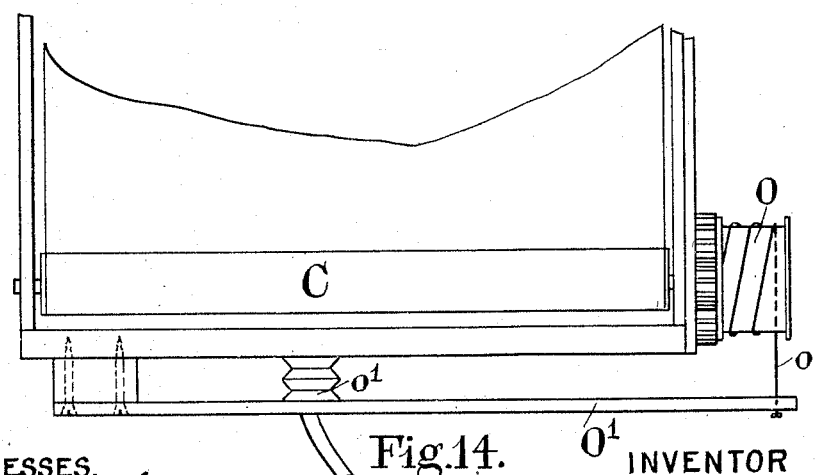

Figure 1. is a side elevation of the shutter with the mechanism in normal position. Fig. 2. is a side elevation showing part of the mechanism set for an instantaneous exposure and ready to be released. Fig. 3. is a side elevation showing the position of the releasing and actuating levers when moved to release the blind for exposure. Fig. 4. is a side elevation showing part of mechanism in position for a time exposure the arresting lever having been moved into the path of the stop pin. Fig. 5. is a sectional elevation through the blinds and blind rollers showing the blinds in normal position similar to Fig. 1. Fig. 6. is a similar sectional elevation showing the relative positions of the two blinds at the commencement of their travel for an instantaneous exposure, similar to Fig. 3. Fig. 7. is a side elevation of a modification of a narrow shutter plate showing the mechanism in normal position. Fig. 8. is a side elevation of same showing the position of the releasing and actuating levers when moved to release the blind for exposure. Fig. 9. is a front elevation of Fig. 8. Fig. 10. is a side elevation showing mechanism for returning the capping blind to normal position particularly in shutters having a wide opening where the capping blind has not sufficient force applied by the spring. Fig. 11. is a side elevation of same showing actuating levers in moved position. Fig. 12. is a front elevation showing mechanism for cutting out of gear the capping blind when it has descended just sufficient for its opaque portion to cover the opening. Fig. 13. is a front elevation of same showing capping blind cut out. Fig. 14. is a front elevation of an arrangement for making an exposure by using the capping blind alone, with a shutter same as shown in Figs. 1 to 5. Fig. 15. is a side elevation of an arrangement for making an exposure by means of a blind descending and ascending with a shutter as shown in Figs. 7 to 9.

The shutter is constructed with two blinds A and B which travel in unison in a downward direction to effect an exposure and travel separately in the reverse direction the blind A to cover or "cap" the exposure aperture and the blind B to set the shutter prior to an exposure. The "capping" blind A is connected directly to the lower roller C which is a plain roller running freely in bearings and by tapes or cords *a* to an upper roller C′ which is a spring driven roller. The setting blind B is connected directly to the upper roller D which is a plain roller running freely in bearings and by tapes or cords *b* to the lower roller D′, which is a spring driven roller. The strength of the driving spring *d* of the roller D′ is greater than that of the spring *c* of the roller C′ so that the spring *d* can draw the two blinds A and B off the top rollers C′ and D simultaneously and at any desired speed while the strength of the driving spring *c* is only sufficient to draw the capping blind A back to normal position when the connection between it and the blind B is released or withdrawn.

The spindle of the blind roller D is fitted at its end with a pinion *e* to gear with a setting wheel E pivoted on a stud on the side of the shutter frame and the spindle of the driving roller D′ is fitted with a pinion *f* to gear with a carrier wheel F. The spindle of the capping blind roller C is also fitted with a pinion $f'$ to gear with the carrier wheel F. The carrier wheel F is pivoted on a rocking lever G fulcrumed upon the spindle of the roller C behind the pinion $f'$ so that the teeth of the pinion $f'$ and wheel F are permanently in mesh whereas the teeth of the pinion $f$ and wheel F are normally out of gear (see Fig. 1) until the lever is rocked forward to bring them into mesh (see Fig. 3.) The wheel F is stripped of a few teeth in part of its periphery to allow free movement of the pinion $f$ and roller D' and a toothed segment is attached to the side of the wheel F to insure continuous gearing with the pinion $f'$, the teeth of the pinion $f'$ being broader than the teeth of the pinion $f$.

The setting wheel E is provided with a winding knob E' by which it and the pinion $e$ can be rotated to wind the setting blind B upon the roller D and draw it away from the exposure aperture until its edge $b'$ is clear of the edge $a'$ of the capping blind A so as they travel together there is a slit $a^2$ between the two edges. The rotation of the wheels E and $e$ and winding of the blind B on the roller D draw the tapes $b$ off the spring roller D' and tighten the spring $d$ so that when released the spring acts to rewind the tapes $b$ on the roller D' and draw down the blind B across the exposure aperture of the shutter. The setting wheel E is held in its set position by a pawl $e'$ which engages with the teeth on its periphery being held in contact therewith by a spring $e^2$.

Two studs or pegs $h$ $h'$ are fitted to the face of the setting wheel E the stud $h$ being further from the center of the wheel than the stud $h'$. A stop lever H is pivoted on the frame at one side of the wheel E with a hooked end $h^2$. When in normal position for an instantaneous exposure the hooked member $h^2$ is in the path of the stud $h$ (see Figs. 1 to 3) and when set for a "time" exposure it is moved into the path of the stud $h'$ (see Fig. 4.) It is held in this latter position by a flat spring $h^3$ a projection on the side of which springs into an indent or recess on the side of the lever H. A stop lever J is pivoted to the frame and transverse to the rocking lever G and is engaged by a pin $j$ on the wheel F.

A releasing lever K is pivoted to the side of the frame and is connected by a link $k$ with the rocking lever G and is so placed that the upper end $k'$ when moved will contact with the tail of the pawl $e'$. The movement of the lever K therefore moves simultaneously the rocking lever G and the pawl $e'$ bringing the carrier wheel F into mesh with the pinion $f$ on the spring roller D' and releasing the setting wheel E. The two blinds are drawn down simultaneously by the action of the spring $d$ in the roller D' until the rotation of the setting wheel E is arrested by the hooked end $h^2$ of the stop lever H engaging the stud $h$. The stop lever H is brought into position for a "time" exposure (see Fig. 4) by rotating the wheel E until the stud $h$ engages the back of the lever which is thereby thrown forward into the path of the stud $h'$, and on the wheel E being released by the withdrawal of the pawl $e'$ its rotation of the wheel is stopped by the hook $h^2$ engaging the stud $h'$ and at the same time the travel or unwinding of the blind B from the roller D is stopped at the time the edge $b'$ is at the top of the exposure aperture the tapes $b$ only having been unwound therefrom and wound upon the spring driven roller D'. At the same time the capping blind A has been drawn down leaving the whole of the exposing aperture uncovered and so remains until the rocking lever G is allowed to spring back carrying the wheel F out of gear with the pinion $f$ when the capping blind A is drawn back by its spring roller C'.

The capping blind A is so set upon its rollers that the top edge $a'$ travels from the top of the exposure aperture each time it is released. And the exposure blind B is so set upon its rollers that its lower edge $b'$ can be drawn up to coincide with the edge $a'$ of the capping blind or it can be wound up on the roller C to any distance the tapes $b$ being withdrawn from the spring roller D'. The further the blind B is wound up on the roller D so far will the edge $a'$ of the capping blind A be in advance of the edge $b'$ and the slit or opening between the two edges will be correspondingly wide. To allow the exposure blind B to follow the capping blind A and close the exposure aperture after the edge $a'$ of the latter has reached the bottom of the exposure aperture, the toothless part of the periphery of the carrier wheel F comes opposite to the pinion $f$ thereby disengaging the latter therefrom which leaves the roller D' free to rotate and wind on the blind B without further rotation of the roller C. The distance which the blind B is wound up is indicated by the arrow heads or other marks on the face of the setting wheel E the end of the pawl $e'$ acting as a pointer or indicator.

A modified arrangement of the releasing and controlling levers and mechanism is shown in Figs. 7, 8 and 9 by which the parts can be placed upon or accommodated to a narrower shutter plate. The blinds A and B and the rollers C C' D D' are arranged as hereinbefore described with a pinion $e$ on the roller D a pinion $f$ on the roller D' and a pinion $f'$ on the roller C' and a carrier wheel F on a rocking lever G'. The rocking lever G' is pivoted on the spindle of the roller D' and the wheel F is permanently in gear with the pinion $f$ and when rocked the wheel F is brought into gear with the pinion $f'$ on the roller C of the capping blind. The setting wheel E is geared to the pinion $e$ of the top roller D by a train of wheels thereby obtaining a smaller or narrower wheel. A ratchet wheel $e^3$ is placed on the spindle of the roller D with which a pawl $e^4$ engages. The ratio of the wheels forming the train between the setting wheel E and the pinion $e$ is such that the wheel E performs one revolution during the travel of the blind B from top to bottom when the blinds are set to give the largest slit or opening. An indicating dial L is fitted to the boss of the setting wheel E. The stop lever or plate H' with a hooked end $h^2$ is mounted on the shutter frame to slide longitudinally being held in position by headed screws or pins $h^3$ and $h^4$ passed through slots therein. The stop lever H' is made with two members $h^2$ and $h^5$ the hooked member $h^2$ being cranked to slide over the front side of the setting wheel E and the member $h^5$ being flat to slide behind the setting wheel E.

The setting wheel E is provided with two studs or pins $i$ and $i'$ one projecting from the face and the other projecting from the back and the member $h^5$ of the stop lever H' is provided with a pin or stud $h^7$ which is placed in the path of the pin $i'$ when the lever H' is moved up for "time" exposure.

The pawl $e^4$ is raised by a link or lever M with an incline $m$ at its lower end with which an incline $m'$ on the rocking lever G' engages.

On the side of the stop lever H' a rib or projection $h^8$ is raised with which a pin $g^2$ on the rocking lever G' engages to hold it in its raised position during a time exposure against the action of the spring which draws it back.

The stop lever H' is normally in the position shown in Fig. 7, when set for an instantaneous exposure and when released the setting wheel E rotates until the pin $i$ rests against the head of the hooked member $h^2$. To set stop lever H' for time exposure the wheel E is rotated until the pin $i$ engages the hook $h^2$ and raises the stop lever H' into the position shown in Fig. 8, thereby lifting the pin $h^7$ above and into the path of the pin $i'$ so that when the blinds are released the rotation of the wheel E is arrested by the pin $i'$ engaging the pin $h^7$.

To release the blinds the rocking lever G', is pressed inward at its upper end, the incline $m'$ thereon acting on the incline $m$ of the lever M raises it and releases the pawl $e^4$ and simultaneously the wheel F is thrown into engagement with the pinion $f'$.

In the arrangement shown in Figs. 10 and 11 a train of wheels $n$ $n'$ are carried on a rocking lever N to connect the pinion $e$ on the capping blind roller C' with the setting wheel E either to assist the spring $c$ or in substitution therefor to automatically return the capping blind A to its position covering the lens or exposure aperture. The rocking lever N is so pivoted as when raised to withdraw the wheel $n$ out of engagement with the setting wheel E and the wheel $n'$ out of engagement with the roller pinion $e$. The lever N is raised by a lever $n^2$ placed between the releasing lever K and the pawl $e'$. The mechanism in other respects works in the manner already described. During the exposure the wheels $n$ and $n'$ are moved out of gear but during the process of setting the shutter the wheels $n$ and $n'$ are in gear and by the rotation of the setting wheel the capping blind A is returned or assisted to return to its normal position.

In the arrangement shown in Figs. 12 and 13 the tapes $a$ attached to the capping blind A are shortened so that the blind is only allowed to ascend and descend just sufficient for its opaque portion to cover, and uncover, the exposure opening, so that in the making of an exposure with any desired aperture, the two blinds A and B travel down together, until the capping blind A has uncovered the opening of the shutter box. When it reaches this position the tapes $a$ prevent it traveling around farther, and at the same time as it reaches this position it is thrown out of gear with the blind B, which continues to travel down, and complete the exposure. The pinion $f$ attached to the capping blind roller C is thrown out of mesh with the wheel F by a screwed spindle $c^2$ to which it is affixed working in a threaded bearing $c^3$ in the side plate of the shutter and passing through the roller C.

The pinion $f'$ is firmly fixed to the spindle $c^2$ which slides through the roller bushes fast to the roller. A flat portion of the spindle and a pin in the bush insure the roller and spindle revolving together, but do not prevent the spindle from sliding through the bushes of the roller. The end of the spindle $c^2$ terminates in an enlarged threaded part $C^2$, which works in a threaded bearing $c^3$ fastened to the side of the shutter box. A slight movement is permitted between this bearing and the shutter box, which prevents the spindle from binding, if the threads of the screw should be out of true. When the shutter is set ready to make an exposure, the capping blind A is across the opening and pinion $f$ and spindle $c^2$ are screwed in as shown in Fig. 12. As the blinds run down in making an exposure, the pinion $f$ is gradually forced away from the intermediate wheel F being so adjusted, that it comes out of gear with F when the capping blind has crossed the opening as in Fig. 13 thus allowing the blind B and wheels $f'$ and F to revolve until the blind B has crossed the opening. Directly the pinion $f'$ becomes disengaged from the wheel F the spring in the spring roller C' of the capping blind A reverses the direction of rotation of the pinion $f'$ and tends to screw it in again, but is prevented until the exposure is completed, as the wheel F is still revolving in the opposite direction and so keeps it screwed out. When the exposure is completed and the intermediate wheel F is withdrawn from the pinion $f'$ to its normal position as in Fig. 12 it no longer prevents the pinion $f'$ from screwing in, and so it is free to return to its first position. In some instances, particularly in shutters having a wide opening, it is an advantage to keep the top roller under weak spring tension. In other respects the mechanism is the same as that already described.

In the arrangement shown in Fig. 14 "time" exposures can be effected by working the capping blind alone similar to the method adopted for focusing. This is particularly applicable for shutters of large size. A drum O is attached to the end of the spindle of the capping blind roller C or to the intermediate wheel F when the same is in permanent gear with the pinion $f$. A cord $o$ of sufficient length to rotate the roller C is wound upon the drum O. The cord $o$ may be operated by a direct pull by hand, or by a lever O' acting in conjunction with any of the usual pneumatic or wire releases. An extending sleeve on the capping blind roller C has a threaded part on which the drum O can be screwed. The cord $o$ is wound around the drum O, one end being attached to same, the second end being fastened to the lever O' hinged to the bottom of the shutter box. A pneumatic bulb $o'$ is placed between the box and the lever, which is expanded by means of a ball or bellows connected to same by a tube. On expanding the bulb $o'$ the lever O' is forced away thus operating the roller and capping blind.

In the arrangement shown in Fig. 15 the capping blind A is worked alone for time exposure. A toothed drum P is pivoted on a rocking arm $p$ and a coiled spring $p'$ under tension is inclosed within it. The toothed drum P is normally held out of gear with the capping blind roller C.

One end of the coiled spring $p'$ is attached to the toothed drum, the other end to the winding key $p^2$ fixed to the central stud $p^3$. This stud $p^3$ is fixed tightly to the rocking arm $p$ so that while it can be turned by aid of the winding key, the spring $p'$ is not strong enough to turn the stud. The drum P is prevented from running down when the spring $p'$ is wound up by a spring pawl $p^4$. It will be seen that when the spring $p'$ is tensioned, and the arm $p$ pushed over, the drum P will revolve directly it leaves the end of the pawl $p^4$, which does not take place until the drum has gone into gear with the pinion $f$. The drum then winds down the pinion and blind and makes the exposure. To complete the exposure, the arm is allowed to return by means of the spring $p^5$ to its normal position, thereby withdrawing the teeth of the drum P from the pinion $f$, the pinion being free, the spring $c$ in the roller C' at once pulls up the capping blind and covers the opening. Spring $p'$ will need resetting before another exposure can be made in this manner. The arm $p$ can be operated by a pin on an "antinous" wire mechanism, or ball and tube can be fitted to operate the arm. Making exposures by means of one blind descending and ascending, has the advantage of giving the foreground of the picture a more prolonged exposure than that accorded to the opposite side of the plate.

What I claim as my invention and desire to protect by Letters Patent is:

1. In a photographic shutter the combination with two blinds traveling in the same direction and means for releasing such blinds to travel simultaneously of means by which the capping blind is disconnected from the exposure blind and permitted to travel separately to automatically return and cover the exposure aperture substantially as described.

2. In a photographic shutter, the combination with two blinds, of a driving roller carried by one blind, a roller carried by the other blind, gearing connecting the rollers to cause the blinds to travel simultaneously, and means for disconnecting the blinds.

3. In a photographic shutter, the combination with two blinds and mechanism for releasing said blinds, of rollers carried by the blinds, pinions on said rollers, a rocking plate and a gear wheel mounted on said plate and permanently in engagement with one of said pinions and adapted to mesh temporarily with the other pinion.

4. In a photographic shutter the combination with two blinds and rollers upon which they are respectively mounted and pinions on the ends of the rollers, of a setting wheel to gear with the top roller a pawl to engage therewith, pins or projections on the setting wheel, a movable stop piece to arrest the rotation of the wheel, a carrier wheel to gear the bottom rollers and connect them, a rocking lever on which the carrier wheel is pivoted to hold it permanently in gear with one roller and temporarily in gear with the other roller and means for moving the retaining pawl and the rocking lever simultaneously substantially as described.

5. In a photographic shutter the combination with two blinds A and B rollers C C' and D D' upon which they are respectively mounted and pinions $e$ $f$ $f'$ on the ends of the rollers of the setting wheel E engaging the pinion $e$ of the top roller, a pawl $e'$, pins or projections $h$ $h'$ on the setting wheel E, a movable stop piece H to arrest the rotation of the setting wheel, a spring $h^3$ to retain the stop piece H in position, a rocking lever G, a carrier wheel F thereon gearing with the pinions $f$ $f'$ and a lever K by which the pawl $e$ and the rocking lever F are simultaneously moved substantially as described.

6. In a photographic shutter the combination with two blinds and means for setting and releasing same of a rocking lever G and a gear wheel F pivoted thereon which is permanently in gear with the pinion on one roller and is temporarily brought into gear with the pinion on the other roller to cause the two blinds to travel simultaneously and to permit of one returning separately to normal position substantially as described.

7. In a photographic shutter the combination with two blinds, rollers upon which they are mounted, means for setting and releasing the two blinds together and means for connecting the two blinds together so that one may return independently of the other, of means by which the capping blind can be alone operated to effect a time exposure substantially as described.

8. In a photographic shutter the combination with two blinds, rollers upon which they are mounted, means for setting and releasing the two blinds together and means for connecting the two blinds together so that one may return independently of the other of a drum on the spindle of the capping blind roller and a lever, spring and cord by which the capping blind can be operated independently of the mechanism of the other blind to effect a time exposure substantially as described.

In testimony whereof I have signed my name to this specification in the presence of two subscribing witnesses this 7th day of July, 1909.

FRANK PHILIP WHITEHEAD.

Witnesses:
    J. OWDEN O'BRIEN,
    H. THOMPSON.